United States Patent
Snyder et al.

(10) Patent No.: US 8,540,151 B1
(45) Date of Patent: Sep. 24, 2013

(54) METHOD AND SYSTEM FOR OPTIMIZING THE USEFULNESS OF A CREDIT AND DEBIT CARD PORTFOLIO

(71) Applicants: John Snyder, Westminster, MD (US); Peter C Vogelberger, Birmingham, AL (US); Howard M Saperstein, Boca Raton, FL (US)

(72) Inventors: John Snyder, Westminster, MD (US); Peter C Vogelberger, Birmingham, AL (US); Howard M Saperstein, Boca Raton, FL (US)

(73) Assignee: OptiWallet, LLC, Birmingham, AL (US)

( * ) Notice: Subject to any disclaimer, the term of this patent is extended or adjusted under 35 U.S.C. 154(b) by 0 days.

(21) Appl. No.: 13/803,182

(22) Filed: Mar. 14, 2013

(51) Int. Cl.
*G06K 5/00* (2006.01)

(52) U.S. Cl.
USPC ........... 235/380; 235/375; 235/449; 235/451; 235/486; 235/492; 235/493; 705/39; 705/40

(58) Field of Classification Search
USPC ................. 235/375, 380, 383, 449, 451, 486, 235/492, 493; 705/39–45
See application file for complete search history.

(56) References Cited

U.S. PATENT DOCUMENTS

| | | | |
|---|---|---|---|
| 7,455,221 B2 | 11/2008 | Sheaffer | |
| 7,753,264 B2 * | 7/2010 | Shafer et al. | 235/380 |
| 8,245,909 B2 * | 8/2012 | Pletz et al. | 235/379 |
| 2007/0284434 A1 * | 12/2007 | Fletcher | 235/379 |
| 2008/0052225 A1 | 2/2008 | Walker et al. | |
| 2008/0116260 A1 * | 5/2008 | Shafer et al. | 235/380 |
| 2010/0205091 A1 * | 8/2010 | Graziano et al. | 705/40 |
| 2011/0153403 A1 * | 6/2011 | Postrel | 705/14.29 |
| 2012/0123841 A1 * | 5/2012 | Taveau et al. | 705/14.23 |
| 2013/0024371 A1 * | 1/2013 | Hariramani et al. | 705/41 |

OTHER PUBLICATIONS

Onlinecreditcardfinder.com.
creditcards.com.
comparecards.com.

* cited by examiner

*Primary Examiner* — Tuyen K Vo
(74) *Attorney, Agent, or Firm* — Oliver & Grimsley, LLC; Larry J. Guffey

(57) ABSTRACT

A method, for maximizing the financial benefits that accrue to one from optimally taking advantage of the incentives offered by the various providers of credit cards, includes the steps of: (1) collecting card provider information regarding currently offered incentives, (2) collecting one's information regarding past and proposed card purchases, (3) analyzing this information to determine the benefits that would accrue to one from making the proposed purchase with each of one's available cards, (4) communicating the results of this analysis so as to enable it to be used in selecting the card to be used in one's next purchase, (5) presenting the incentives of other cards which are not in the one's card portfolio, and (6) if one is considering adding one of these other cards to one's portfolio in order to take advantage of its incentives, advising of the impact on one's credit rating of applying for a new card.

20 Claims, 5 Drawing Sheets

```
DEBIT AND CREDIT CARD
   PORTFOLIO MANAGER
          LOGIN
USER ID    [JIMMYSMITH]
PASSWORD   [•••••••••]
    ☐ KEEP ME LOGGED IN
    ☐ REMEMBER ME
SECURITY QUESTION
   YOUR BIRTH CITY?
ANSWER
  [BALTIMORE]
        ( LOGIN )
    IF YOU ARE NOT A
    REGISTERED USER
  ( GO TO REGISTRATION )
```

FIG. 3

```
DEBIT AND CREDIT CARD
   PORTFOLIO MANAGER
       REGISTRATION
USER ID*    [JIMMYSMITH]
PASSWORD*   [•••••••••]
SECURITY:
QUESTION*   [BIRTH CITY?]
ANSWER*     [BALTIMORE]
HOME COUNTRY*      [USA]
HOME CURRENCY*     [ $ ]
EMAIL ADDRESS*
  [JSMITH@DACCPM.COM]
 ☐ OPT OUT CARD SUGGESTIONS
SOCIAL NETWORKS    ☐ ☐
SMART PHONE NUMBER
 [555-555-1234]
   *REQUIRED FIELDS
       ( REGISTER )
```

DEBIT AND CREDIT CARD PORTFOLIO MANAGER

CARD MAINTENANCE
- ADD  UPDATE  DELETE
- ⦿ CREDIT  ○ DEBIT  ○ OTHER
- NETWORK: VISA
- ISSUER: CITI
- CATEGORY: SIMPLICITY
- EXPIRATION (MM/YY): 11/15
- CARD CURRENCY: $
- CREDIT LIMIT: 3,000.00
- CURRENT BALANCE: 1,724.66
- STANDARD PAYMENT PLAN
- ⦿ FULL BALANCE  ○ MINIMUM
- ○ FIXED MONTHLY: $500

FIG. 6

DEBIT AND CREDIT CARD PORTFOLIO MANAGER

SHOPPING LIST UPDATE
- NEW  UPDATE  DELETE
- SHOPPING LIST NAME: CHANUKAH
- TOTAL LIST ITEMS: 5
- ESTIMATED VALUE: $375.00
- PURCHASED TO-DATE: 2
- SPENT TO-DATE: $152.66

LIST ITEM
- ADD  UPDATE  DELETE
- PRODUCT TYPE: APPLIANCE
- PRODUCT NAME: TOASTER OVEN
- NEED BY DATE: 12/01/2012
- STATUS: STILL SHOPPING
- ESTIMATED PRICE: $78.52

**DEBIT AND CREDIT CARD
PORTFOLIO MANAGER**

ENTER PURCHASE
○ ONLINE ◉ IN-STORE
MERCHANT TYPE
| GROCERY |
PRODUCT TYPE
| APPLIANCE |
UPC | 012345678901 |
MERCHANT NAME
| SAFEWAY |
PRICE | $ | 231.55 |
( FIND BEST CARD )
| CITIBANK VISA
AMERICAN EXPRESS
CAPITAL ONE |
( RECORD PURCHASE )

FIG. 7

**DEBIT AND CREDIT CARD
PORTFOLIO MANAGER**

DEAL QUERY STATUS
◉ CREDIT ○ DEBIT ○ OTHER
NETWORK    VISA
ISSUER     CITI
CATEGORY   SIMPLICITY
DEAL TITLE  5% CASH BACK
EFFECTIVE START - END DATES
 01/01/2013          01/01/2013
DEAL TYPE   REBATE
REWARD      5% ON PURCHASES
RESTRICTIONS
   GROCERIES AND GAS ONLY
◉ INSTORE  ○ ONLINE  ○ BOTH
PREREGISTRATION  COMPLETED
MINIMUM / MAXIMUM AMOUNT
   $3,000 /            NONE
PURCHASES TO-DATE   $2,778.61
BENEFIT TO-DATE         $0.00
( OK )

FIG. 8

METHOD AND SYSTEM FOR OPTIMIZING THE USEFULNESS OF A CREDIT AND DEBIT CARD PORTFOLIO

BACKGROUND OF THE INVENTION

1. Field of the Invention

The present invention relates generally to the field of data processing and the financial management of one's portfolio of credit and debit cards. More particularly, the present invention enables one to maximize the financial benefits that accrue to one who, when making purchases, optimally takes advantage of the temporarily varying special deals and incentives offered by the various providers of credit and debit cards.

2. Description of the Related Art

Most consumers today use credit and/or debit cards for some of their purchases, often by selecting from the multiple cards in their wallets. Card issuers or providers actively promote the use of their cards by offering special deals to consumers when they obtain their card. Some deal elements apply for a limited time when the holder first receives the card, e.g., interest free balance rollover for six months, and others apply permanently to the card, e.g., cash rebates at a fixed percentage of purchases. In addition, many card issuers periodically offer temporarily varying, special deals to their cardholders as an extra incentive to select their card when making purchases. These incentives usually take the form of bonus perks, such as airline miles or other travel credits, cash back, rebates, etc.

There are various parameters associated with these deals, both for those that are permanent and temporary. But there are no standard deals or perks. For temporary deals, the most common parameters are: (a) valid within an effective date range, (b) valid only for particular merchants, product types and/or shopping methods (e.g., online or instore), and (c) minimum purchase requirements. The cardholder sometimes needs to register for ("activate") these deals for them to go into effect and start accumulating benefits. In addition, temporary offers may be made to redeem rewards at a higher value, e.g., obtain discounted gift cards for specific merchants.

For those who have multiple cards, each of which has its own set of special deals and incentives, it is practically impossible for one to timely keep up with and compare the benefits that would accrue to the individual depending on which of his or her cards is used to make a specific purchase. If the individual is willing to consider applying for and using a new card to make a specific purchase where the enrollment benefits of the new card would be especially beneficially to the individual, this greatly increases the numbers of cards for which this comparative benefits analysis must be done and thereby make it a task that is totally impossible to do in a timely manner. This is particularly true at the instant of purchase in a retail merchant environment, or even at the final step of completing an online purchase.

There do exist on the internet a few websites that provide generalized information on available cards and the incentives being offered by different card providers (e.g., "onlinecreditcardfinder.com," "creditcards.com"). However, these are primarily "do-it-yourself or self-help" websites on which an individual can get some of the information that they might need to include in any analysis that he or she might undertake to determine which of the cards in one's portfolio is the "best (with respect to the net financial benefit received)" card for one to use for a particular purchase.

There is a need for a method or system that can keep track of all the deals available to a consumer—especially one who can select from a portfolio of cards on which to make a specific purchase. Such a system should ideally automatically perform the analysis necessary in order to advise a consumer on how to, when making a proposed purchase, maximize the financial benefits that would accrue to the consumer from optimally taking advantage of the many temporarily varying deals and incentives offered by the various card providers.

SUMMARY OF THE INVENTION

Recognizing the need for the development of a method and system for tracking and comparing available card deals so as to enable one to assess which of his or her cards is the "best" card (with respect to the net financial benefit received) to be used for a proposed purchase, the present invention is generally directed to fulfilling this need.

According to the present invention, a method for providing the service, in an environment of networked computing devices which include a service-providing server, of advising a portfolio card holder and service user on how to, when making a proposed purchase, maximize the financial benefits that accrue to the individual, from optimally taking advantage of the temporarily varying deals and incentives offered by the various providers of cards, includes the steps of: (1) collecting and storing information from each of the card providers regarding each of the cards which the provider is currently making available in the marketplace and the general user qualifications guidelines for each of these cards, (2) collecting and storing information from each of these card providers regarding their currently offered, temporarily varying, specific deals and incentives that are associated with each of their cards, (3) registering a portfolio card holder to be a user of this service, including collecting and storing information that uniquely identifies the user and each of the various cards in the portfolio of the user, (4) collecting and storing information from the user pertaining to the proposed purchase for which the service advice is desired, (5) analyzing, using the information on: (a) the user's proposed purchase, (b) the identifying information on each of the various cards in the portfolio of the user, and (c) the temporarily varying deals and incentives applicable to each of the various cards in the portfolio of the user, to determine the comparative financial benefits that would accrue to the user from making the proposed purchase with each of the cards in the user's portfolio, and (6) communicating this comparative-financial-benefits analysis results pertaining to the proposed purchase to the user.

This method may also further include the steps of: (7) extending the analysis to determine the comparative financial benefits that would accrue to the user from making the proposed purchase with each of the cards in the marketplace that are not currently in the user's portfolio, (8) communicating the results of this comparative-financial-benefits extended analysis to the user for all those credits cards whose benefits exceed those of the maximum benefit provided by the cards currently in portfolio of the user, and (9) providing links to the major credit bureaus for the purpose of evaluating the effect of modifying the user's card portfolio.

Additionally, this method may also further include the steps of: (10) collecting and storing information on each of the card purchases made by the user, (11) analyzing this purchase information so as to determine the current status of the total amounts of the purchases on each of the cards for a specific periods of time, and (12) utilizing, for each of the cards, the current status of the total-purchase-amounts-per-period determinations in determining the benefits that would accrue to the user for each of the next proposed purchases.

Alternatively, the present invention can be seen to be a method for providing the service, on card purchases, of maximizing the financial benefits that accrue to an individual from optimally taking advantage of the temporarily varying deals and incentives offered by the various providers of cards. This method includes the steps of: (1) collecting and storing card provider information regarding currently offered, specific deals and incentives, (2) collecting and storing an individual's information regarding past and proposed card purchases, (3) analyzing this information to determine the comparative financial benefits that would accrue to the individual from making the proposed purchase with each of the cards available to the individual, and (4) communicating the results of this comparative-financial-benefits analysis to the individual in a manner that will enable it to be used in selecting the card to be used in the individual's next purchase.

Thus, there has been summarized above (rather broadly and understanding that there are other preferred embodiments which have not been summarized above) the present invention in order that the detailed description that follows may be better understood and appreciated.

BRIEF DESCRIPTION OF THE DRAWINGS

FIG. 3 presents an example of a possible "login screen" for the present invention.

FIG. 4 presents an example of a possible "registration screen" for the present invention.

FIG. 5 presents an example of a possible "card maintenance screen" for the present invention.

FIG. 6 presents an example of a possible "shopping list screen" of the present invention that a registered user may elect to use.

FIG. 7 presents an example of a possible "input purchase screen" of the present invention that a registered user utilizes to input the specific information for a planned purchased that the present invention needs in order to advise the user as to which card is "best" to use for the planned purchase.

FIG. 8 presents an example of a possible "deal query status screen" of the present invention.

DESCRIPTION OF THE PREFERRED EMBODIMENT

Figure 1:
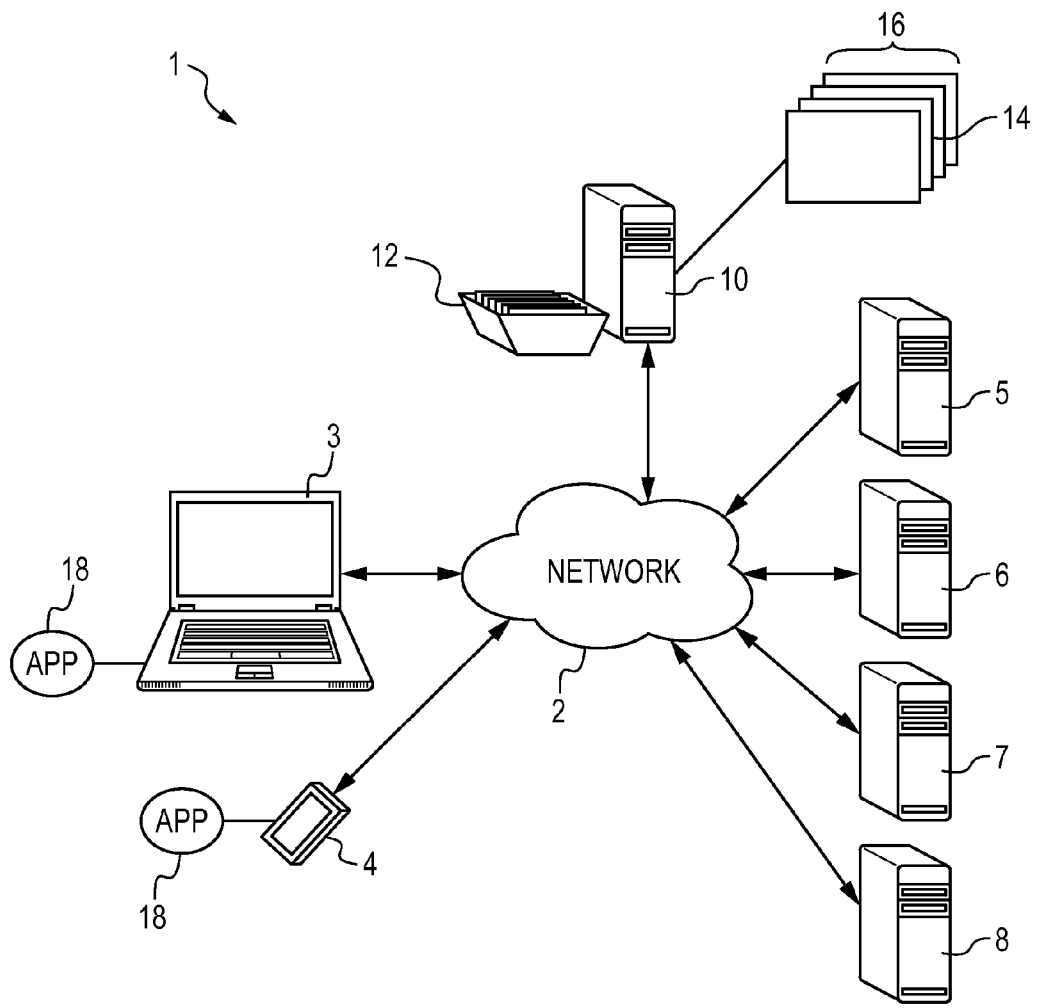
FIG. 1 is a block diagram illustrating the general architecture of a system of the claimed invention.

Before explaining at least one embodiment of the present invention in detail, it is to be understood that the invention is not limited in its application to the details of construction and to the arrangements of the components set forth in the following description or illustrated in the applications drawings or figures. The invention is capable of other embodiments and of being practiced and carried out in various ways. Also, it is to be understood that the phraseology and terminology employed herein are for the purpose of description and should not be regarded as limiting.

For example, the word "card" is used herein consistently to refer to a mechanism used to make purchases from a financial account. However, this mechanism may or may not be associated with a physical, plastic, credit or debit card of any type, either at the time of purchase or in general. Further, the card may not operate as a conventional credit or debit card. Rather, it may embody an alternative consumer purchase mechanism, such as a gift card or customer loyalty card. As financial technology evolves, it is anticipated that physical, plastic cards will be used less and less, and that other devices, like smart phones, etc., will replace them. In addition, online purchases use simple account identification and verification data parameters which may not be associated with an actual card. Therefore, the word "card" used in this application need not imply the use or existence of an actual card. This invention is designed to be used with any current or future payment mechanism which links purchases to a financial account.

For a second example, the word "deal" should be recognized to be used herein to reference the combined financial arrangements, both costs and rewards, from a card issuer or provider to a cardholder, both permanent and temporary, associated with the use of their card.

The present invention generally relates to a method, system and means for enabling one to maximize the financial benefits that accrue to one who, when making a purchase, optimally takes advantage of the special deals and incentives offered by the various providers of the cards in one's portfolio of cards. The present invention can even alert one to other heretofore-unknown, cards for which one could apply and that happen to be offering incentives that would be especially beneficial if applied against those purchases which one soon plans to make.

For example, assume one has a card portfolio that consists of two credit cards, X and Y, and one debit card, Z. Further assume that these cards are currently offering the following incentives (wherein all points are redeemable at 1 cent/point at all retail stores and restaurants):

X: earn 50,000 points when your cumulative purchases with the card total $5,000 for the calendar year.

Y: earn 20,000 points when your cumulative purchases on the card total $1,000 for the four month period which ends in exactly one month.

Z: no current incentives.

Additionally, assume that: (1) you need to purchase two airline tickets over routes and on dates for which the lowest-priced tickets are $1,000 per ticket, and (2) your cumulative, year-to-date, purchases on card X are $4,500 and your purchases on card Y over the past three months total $200.

How can one use this card portfolio to maximize their cost savings on the purchase of the two desired airline tickets? Answer—purchase one ticket on card X, thereby qualifying for the 50,000 points and applying this $500 worth of points to the ticket price for an out-of-pocket expense of $500; then purchase the second ticket on card Y, thereby qualifying for the 20,000 points and applying this $200 worth of points to the ticket price for an out-of-pocket expense of $800; thus, yielding, in this very idealized situation, the maximum savings of $700 on these ticket purchases.

For the probably more realistic situation in which the year-to-date charges on the cards X and Y are $1,500 and $0, respectively, the answer to the above question is considerably different: purchase both tickets on card Y, thereby qualifying for the 20,000 points and applying this $200 worth of points to the ticket price for an out-of-pocket expense of $1,800; thus, yielding a savings of only $200 on these ticket purchases.

However, unless one is continually searching for card incentive deals, it is probably often the case that there are other cards in the marketplace of which one is unaware—but probably should be, because they are temporarily offering special incentives that could be very beneficial in certain situations. For example, one needing two such airline tickets would benefit greatly from knowing about or being alerted to the existence of an airline credit card, W, for which the ticket seeker can apply and that is offering a temporary, enrollment incentive of a $99 companion ticket with cumulative first year purchases of $1,000—which just happens to be valid and apparently available for the ticket seeker's route and dates of travel.

Under the above scenario, one would achieve maximum saving by purchasing the first tickets on card W, thereby qualifying for the $99 companion ticket which is then used to provide the second needed ticket; thus, yielding a total savings of $901 on these ticket purchases.

While the computations in the above examples were relatively simple, this would not be expected to be the norm in most such calculations. For example, if these card debts could not be paid off immediately, one would have to include in the calculations the cards' interest rates, the expected payoff periods and the carrying costs of any unpaid card balances. All such calculations are easily handled by using the algorithms of the present invention for such analysis steps.

The architecture of the present invention 1 is described generally in connection with FIG. 1. A user of the present invention 1 connects to a network 2 (e.g., the Internet or other network connection) via a computer processing device such as a laptop 3, desktop PC, smart phone 4, etc. Also connected to this network is the server 10 that is used by the present invention and the servers, e.g., 5-8, of all of the various providers of the credit or debit cards and other interested parties (e.g., credit bureaus) (only 4 of which are shown in FIG. 1), including those cards that exist in the current portfolio of the cards that a user may use to make a specific purchase.

The server 10 that is utilized by the present invention's is used to provide a "card portfolio optimization for maximum financial benefits or usefulness" service according to the claimed invention whereby a user enters into an, e.g., subscription-type, agreement with the entity operating the present invention to provide this service to the user.

The servers 5-8 of the various providers of the cards, etc. also communicate via this network 2 in order to keep the databases 12 (e.g., card providers' input of information pertaining to the cards they are currently offering in the marketplace and the deals & incentives associated with these cards) of the server 10 which is utilized by the present invention appraised of the latest news on the types of deals and incentives that are currently being offered by each of the card providers.

The control software that runs on the server that is used to provide the present invention is configured such that it allows a user or portfolio cardholder to register all of their cards, e.g., Citi Visa, American Express Gold, etc., into one of the present invention's databases (e.g., subscribing user's card registration database). The software of the present invention will, using the information in its card provider's input of deal & incentive database, automatically determine the standard deal associated with each card in the user's portfolio and also automatically track any special deals or incentives that are available for the user's various registered cards.

The software of the present invention is further configured to help manage a user's entire shopping process—i.e., a user can create shopping lists, which can accumulate over time and be updated as purchases are made. Managing the entire shopping process also entails compiling and storing the purchase histories of a service user's various cards. This information is needed when an incentive under consideration is of the "cumulative" type that offers incentives for total purchase levels achieved over various periods of time. The services of the present invention are seen to compliment and make more effective the offerings of the card issuers or providers.

The software of the present invention is also configured so as to integrate with a wide range of computer processing devices and their various input and output mechanisms so as to provide for the use of state-of-the-art shopping technology, such as bar code readers, shopping bots, and point of sale devices to be used with the present invention—a wide range of both online and in-store shopping features are supported by the present invention.

The software of the present invention is additionally configured so as to notify users, through automated proactive alerts, of any special deal registration requirements and instructions they need to attend to, as well as card renewal, deal expirations, etc.

The services of the present invention are provided free (or available at a very nominal charge) to its users. Revenue for the entity that operates the present invention comes primarily from the card issuers or providers and any advertising that may appear on the various webpages or documents 14 of the website, cloud-based service platform, mobile application, software service or similar communication means 16 that is maintained to publicize the services of the present invention and to enable the users' registration processes, etc. Such advertising may also appear on any special software applications 18 of the present invention that may be needed to run on the various computing devices (e.g., smart phones) that are used by the present invention in providing its "card portfolio optimization" services. Advertising may include links to card application websites.

The software of the present invention is also configured so as to support full international use, with multi-language and multi-currency functionality.

Figure 2:
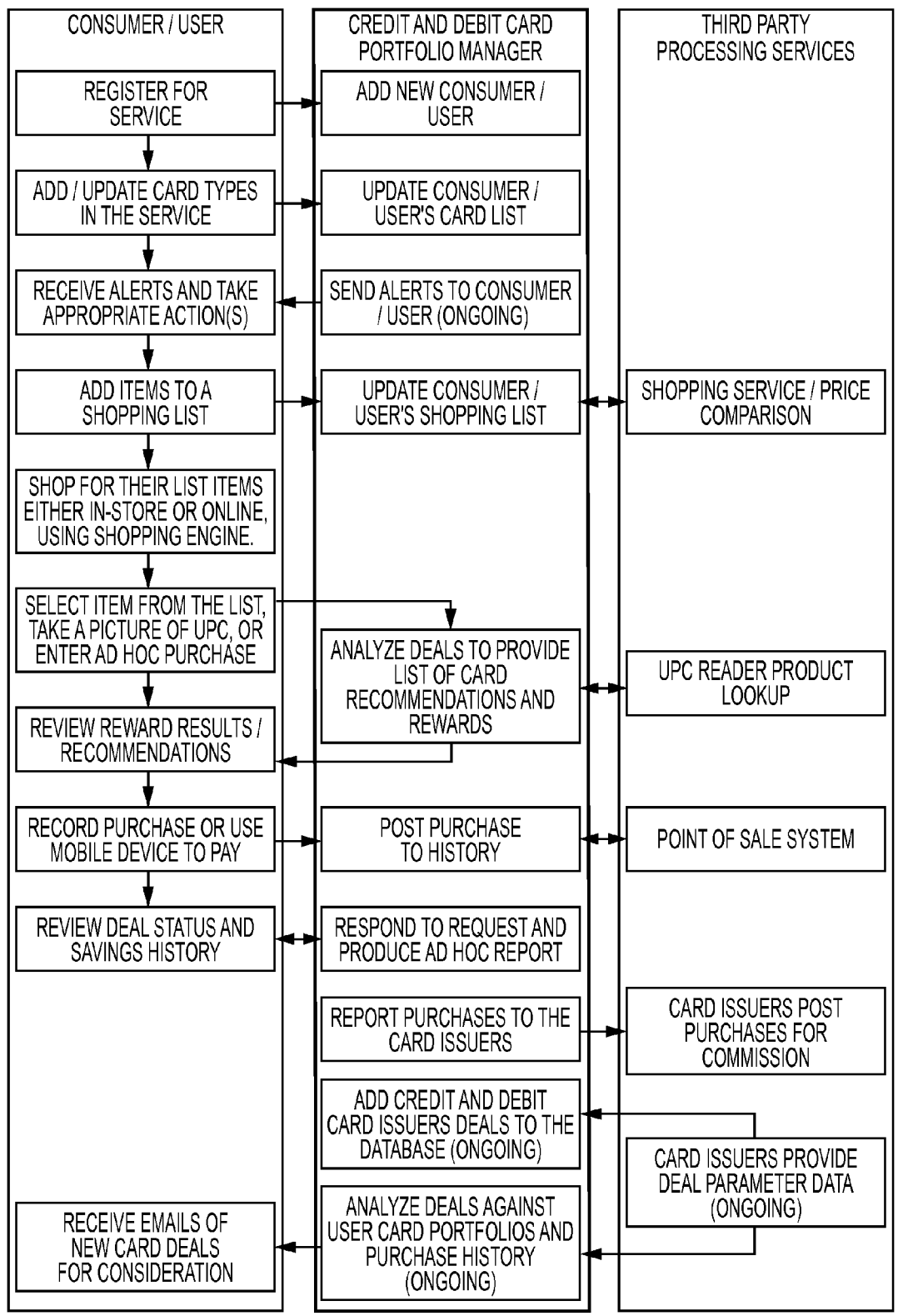
FIG. 2 is a block diagram that provides an overview of some of the process steps and communications that occur in the operation of the present invention.

The present invention collects and centralizes all of the important information related to a user's multiple card payment options. FIG. 2 provides an overview of some of the process steps and communications that occur in the operation of the present invention.

A service user's or consumer's required tasks in using the present invention are seen to be minimal: register (once), load card types (initially and when they change), summarize potential purchases (e.g., at point of sale). All of the various providers' card deal costs and benefit data is backend loaded and updated automatically. Additionally, the software of the present invention can be further configured to make a service user's registration even more easy and convenient by allowing much of the required data to be automatically entered by utilizing existing banking interfaces and any software which a user may already be using and where such data would be stored (e.g., in Quicken®).

The software of the present invention is configured to implement algorithms to compare between disparate combinations of card costs and benefits, (e.g., cash rebates versus airline miles, balance interest costs versus various purchase rewards, individual transaction rewards versus cumulative bonuses) in order to provide card recommendations for a wide assortment of shopping activities. Since there are in the computation literature many suitable forms of algorithms which are available for one to utilize to make these comparisons, such algorithms will not be discussed in any detail herein.

The present invention is ideally configured in such a manner as to build on and complement electronic payment technology, both today and into the future. Because of this commitment, its preferred embodiment is configured to run on a "cloud" server platform for maximum portability. The present invention requires that minimal local software be downloaded or installed. This approach simplifies the usually involved software application (app) certification process. The interface of the present invention is simply a website 16 which its users visit. Local software is only used to enable access to local technology on the user device.

A potential disadvantage to the present invention is that, as currently configured, it will not operate offline. But since its primary function will be performed at the merchant location with a mobile computing device or when shopping with one's personal computer on the internet, an online connection should always be available.

All user interfaces of the present invention, as currently configured, are preferably HTML5 browser based. The software of the present invention is configured so as to perform on Windows and Apple desktops using current browsers. Smartphone and tablet compatibility is also provided—Apple iOS, Android, and Windows 8 are fully supported.

The software of the present invention is configured so that its mobile interface operates with the look and feel of a local application, i.e., launched from an icon without starting the browser, even though it will run through the browser.

As a hybrid mobile application (i.e., cloud-based functionality which also incorporates native device utility), the present invention will be configured to access and utilize the local technology available on mobile devices, in particular cameras, near field communication (NFC) "swipe" sensors and readers (e.g., to UPC barcode scan desired products so that the information for these purchases can be input into the present invention so as to eliminate the user's manual inputting of this information, to execute payments on devices equipped with an NFC chip, to record payments as executed by interfacing with point-of-sale systems), since it is anticipated that these technologies will come into common use in retail purchase environments in the future. Smartphone and tablet cameras are already being used to read UPC barcodes on products; and outside the US, where phones are more ubiquitous than plastic cards, NFC equipped smart phones are used to make payments. GPS/wireless network "location awareness" may be used in the future to automatically identify store locations and types.

The present invention will have a local software application component to allow the present invention to access these devices. Such local software applications will be customized and certified to each supported mobile device.

To better acquaint one with the software requirements of the present invention, shown in this application's FIGS. are various user interface screen illustrations. They could be in a webpage or smart phone or tablet format, but are shown here in a smart phone format.

In addition, the screen illustrations are all presented in English. However, as an international, multi-language, multi-currency invention, the native language environmental setting on each device will be used to automatically select the language presented to the user. Date and currency formats will also match user preferences.

FIG. 3 shows an example of a possible "login screen" for the present invention. It consists of input portions that require a registered user to provide or fill-in his or her User ID or Password. The user may then select between the options of "Keep Me Logged In" or "Remember Me." For security reasons, a "Challenge Question" (to be used if device is not "remembered") is provided that requires the user to input an "Answer." The striking of a "Login" button completes the login process. If not already registered, a button exists to direct a user to a "Go to Registration" screen.

FIG. 4 shows an example of a possible "registration screen" for the present invention. It consists of input portions that require a potential user to create a user ID and Password, and to also setup a "Challenge Question" and prove its Answer. Additionally, a new registrant is required to agree to the terms of service of the system provider. The user also identifies or selects their home country and the currency which will be used in making various purchases. Information is then input or selected which will enable communications between the present invention and the user, such as: Email Address, Facebook ID, Twitter ID, and smart phone number (for call or text messaging). Additional direct "social network push" communication links may be added in the future, based upon user demand. Once these sections are completed, the hitting or striking of a "Register" button completes this registration process. An option is also included to allow the user to opt out of emails presenting new card suggestions.

FIG. 5 shows an example of a possible "card maintenance screen" for the present invention. It consists of input portions that allow a registered user to Add/Update/Delete a card from one's portfolio of credit/debit cards for which the present invention's service is to be applied. This screen has auto loaded lists of various user accounts (credit, debit, gift, shopper loyalty cards with deals attached, etc.), networks (e.g., Visa, MasterCard, American Express, Discover, Diners Club) and the issuers or providers (e.g., American Express, Citi, Chase, Capital One) from which the user may select for inclusion in their portfolio, and then provide additional, select information for the individual cards (e.g., expiration month & year, card currency (defaults to US dollar, $), credit limit and current balance on the card). Account numbers are not entered.

FIG. 6 shows an example of a possible "shopping list screen" of the present invention that a registered user may elect to use. It consists of input fields that enable a user to indicate whether the to-be-created list is to be "Newly Created," Updated" or "Deleted." This shopping list is then given a name and the user can go about adding or deleting items to the list by inputting information pertaining to the item (e.g., item or product type, a specific item name, date by which the item is needed, estimated (if not purchased) or actual (if purchased) price for the item). The software that provides this list then compiles summary information (e.g., total number of items in the list, total estimated purchase value of the listed items, the number of items purchased to date from the list, and the amount spent to date on purchased items from the list).

FIG. 7 shows an example of a possible "input purchase screen" of the present invention that a registered user utilizes to input the specific information for a planned or proposed purchase that the present invention needs in order to advise the user as to which card is 'best" to use for the planned purchase. Buttons on this screen allow the user to indicate whether the planned purchase is to be made "online" or "in-a-store." To identify the planned purchase, there are input selectors that enable a user to select from auto-loaded lists various information about the planned purchase (e.g., merchant type, product type, individual merchant name).

The currency to be used is selected and the items price is input. Hitting or striking a "Find Best Card" button begins the present invention's card optimization process. The result of this process is a screen presentation which lists each of the user's cards and indicates the numerical value of the benefits that will accrue to the user by alternatively using each of the cards in the user's portfolio. This presentation is a prioritized, scrollable listing so as to allow for multiple card choices to be presented on the same screen.

If the individual is willing to consider applying for and using a new card to make a specific purchase—where the enrollment benefits of the new card would be especially beneficially to the individual—these potential new card benefits can also be presented on the same or a similar scrollable screen.

However, applying for a new credit card to try to realize some of these additional benefits can have potential adverse effects upon a service user. This is especially true if the service user is carrying unpaid balances on one or more cards in the service user's portfolio of cards. To ensure that such a service user is as fully informed as possible regarding such potential adverse effects, the software of the present invention also provides linkages to the credit bureaus that can assess such potential effects. If the service user is already a registered customer of one of these credit bureaus, the credit bureau with which the service user is registered already has in its databases the information that will enable the credit bureau to quickly calculate and advise the service user regarding the impact that such a new card application (to take advantage of additional incentives) will have upon the service user's credit rating, etc.

Each of a service user's possible card choices can be highlighted and selected to go to a "Deal Status or Query Screen," see FIG. 8, that allows a user to investigate the benefits that are being ascribed to each of the cards.

Upon the user being confident that the present invention is properly advising the user on the indicated benefits of using each of the cards, the user hits a "Record or Post Purchase" button to indicate that the user is using the highlighted card for this purchase. The information is used to automatically update the various databases of the present invention, including a purchase history for each card (e.g., purchase transaction history data may also be exported to a file for input into personal finance software).

As previously mentioned, this purchase history updating will typically include a determination of the current status of the total-purchase-amounts per a designated period of time. Such determinations can be very influential in determining the benefits that would accrue to the user if the next proposed purchase were to be made on a specific card.

The above-described steps can be implemented using standard well-known programming techniques. The novelty of the above-described embodiment lies not in the specific programming techniques but in the use of the steps described to achieve the described results. Examples of such steps that are applicable to the present invention include:

(1) collecting and storing information from each of the card providers regarding each of the cards which the provider is currently making available in the marketplace and the general user qualifications guidelines for each of these cards, (2) collecting and storing information from each of these card providers regarding their currently offered, temporarily varying, specific deals and incentives that are associated with each of their cards, (3) registering a portfolio card holder to be a user of this service, including collecting and storing information that uniquely identifies the user and each of the various cards in the portfolio of the user, (4) collecting and storing information from the user pertaining to the proposed purchase for which the service advice is desired, (5) analyzing, using the information on: (a) the user's proposed purchase, (b) the identifying information on each of the various cards in the portfolio of the user, and (c) the temporarily varying deals and incentives applicable to each of the various cards in the portfolio of the user, to determine the comparative financial benefits that would accrue to the user from making the proposed purchase with each of the cards in the user's portfolio, (6) communicating this comparative-financial-benefits analysis results pertaining to the proposed purchase to the user, (7) extending the analysis to determine the comparative financial benefits that would accrue to the user from making the proposed purchase with each of the cards in the marketplace that are not currently in the user's portfolio (links may be provided to card application websites), (8) communicating the results of this comparative-financial-benefits extended analysis to the user for all those cards whose benefits exceed those of the maximum benefit provided by the cards currently in portfolio of the user, (9) collecting and storing information on each of the card purchases made by the user (purchase transaction history data may also be exported to a file for input into personal finance software),

(10) analyzing this purchase information so as to determine the current status of the total amounts of the purchases on each of the cards for a specific periods of time,

(11) utilizing, for each of the cards, the current status of the total-purchase-amounts-per-period determinations in determining the benefits that would accrue to the user for each of the next proposed purchases,

(12) alerting a user regarding changes in the deals and incentives being offered for the use of specific cards which the user could use for upcoming purchases,

(13) alerting a user of matters associated with his/her overall portfolio management that need to soon be addressed (i.e., timely card portfolio management matters that the user is advised to consider—e.g., an upcoming card expiration date, an applicable deal that's expiring, a deal that's nearing a relevant award threshold, shopping list due dates), and

(14) alerting a user regarding cards that not currently in the portfolio of the user but which are available to the user and whose use on upcoming purchases could yield for the user financial benefits which are greater than the financial benefits that are yielded by the cards currently in the portfolio of the user.

Software programming code which embodies the present invention is typically stored in permanent storage. In a client/server environment, such software programming code may be stored with storage associated with a server. The code of the present invention may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

It will be understood that each element or step of the FIGS. of this application, and combinations of elements, can be implemented by general and/or special purpose hardware-based systems that perform the specified functions or steps, or by combinations of general and/or special-purpose hardware and computer instructions. These program instructions may be provided to a processor to produce a machine or apparatus, such that the instructions that execute on the processor create means for implementing the functions and steps specified in this application.

The foregoing is considered as illustrative only of the principles of the present invention. Further, since numerous modifications and changes will readily occur to those skilled in the art, it is not desired to limit the invention to the exact construction and operation shown and described herein. Accordingly, all suitable modifications and equivalents may be resorted to, falling within the scope of the invention that are set forth in the claims to the invention.

We claim:

1. A method for providing the service, in an environment of networked computing devices which include a service-providing server, of advising a portfolio credit card holder and service user on how to, when making a proposed purchase, maximize the financial benefits to said portfolio credit card holder that accrue from optimally taking advantage of the temporarily varying deals and incentives offered by the various providers of credit cards, and wherein each of said card providers makes available information on said network regarding the financial aspects of each of said offered deals and incentives of said credit card providers, said method utilizing said service providing server and comprising the steps of:

collecting and storing information from each of said card providers regarding each of the credit cards which each of said card providers is currently making available in the marketplace and the general user qualifications guidelines for each of said credit cards, collecting and storing information from each of said card providers regarding their currently offered, temporarily varying, specific deals and incentives that are associated with each of said credit cards, registering a portfolio credit card holder to be a user of said service, including collecting and storing information that uniquely identifies said user and each of the various credit cards in the portfolio of said user, collecting and storing information from said user pertaining to said proposed purchase for which said service advice is desired, analyzing, using information on: (a) said proposed purchase of said user, (b) said identifying information on each of the various credit cards in the portfolio of said user, and (c) the temporarily varying deals and incentives applicable to each of the various credit cards in the portfolio of said user, to determine the currently available, comparative financial benefits that would accrue to said user from at this time making said proposed purchase with each of said credit cards in said portfolio of said user, and communicating said comparative-financial-benefits analysis results pertaining to said proposed purchase to said user.

2. The method as recited in claim 1, further comprising the step of:

extending said analysis to determine the comparative financial benefits that would accrue to said user from making said proposed purchase with each of said credit cards in the marketplace that are not currently in said portfolio of said user and for which said user meets the qualifications guidelines of each of said credit cards, and communicating the results of said comparative-financial-benefits extended analysis to said user said user.

3. The method as recited in claim 1, further comprising the step of:

collecting and storing information on each of the purchases made by said user with a credit card, analyzing said purchase information so as to determine the current status of the total amounts of the purchases on each of said credit cards for specific periods of time, and utilizing, for each of said credit cards, the current status of the total-purchase-amounts-per-period determinations in determining the benefits that would accrue to said user for each of said next proposed purchases.

4. The method as recited in claim 2, further comprising the step of:

collecting and storing information on each of the purchases made by said user with a credit card, analyzing said purchase information so as to determine the current status of the total amounts of the purchases on each of said credit cards for specific periods of time, and utilizing, for each of said credit cards, the current status of the total-purchase-amounts-per-period determinations in determining the benefits that would accrue to said user for each of said next proposed purchases.

5. The method as recited in claim 1, further comprising the step of:

alerting a service user regarding changes in said deals and incentives being offered for the use of specific credit cards which said user could use for upcoming purchases.

6. The method as recited in claim 4, further comprising the step of:

alerting a service user regarding changes in said deals and incentives being offered for the use of specific credit cards which said user could use for upcoming purchases.

7. The method as recited in claim 1, further comprising the step of:

alerting said service user regarding a timely card portfolio management matter that said user is advised to consider.

8. The method as recited in claim 6, further comprising the step of:

alerting said service user regarding a timely card portfolio management matter that said user is advised to consider.

9. The method as recited in claim 1, further comprising the step of:

is alerting said service user regarding potential adverse effects on the credit rating of said service user of applying for a new credit card.

10. The method as recited in claim 8, further comprising the step of:

alerting said service user regarding potential adverse effects on the credit rating of said service user of applying for a new credit card.

11. An apparatus for providing the service, in an environment of networked computing devices which include a service-providing server, of advising a portfolio credit card holder and service user on how to, when making a proposed purchase, maximize the financial benefits to said portfolio credit card holder that accrue from optimally taking advantage of the temporarily varying deals and incentives offered by the various providers of credit cards, and wherein each of said card providers makes available information on said network regarding the financial aspects of each of said offered deals and incentives of said credit card providers, said apparatus comprising:

a server on said network that includes a processor, software and memory, wherein said software configured to collect and store information from each of said card providers regarding each of the credit cards which each of said card providers is currently making available in the marketplace and the general user qualifications guidelines for each of said credit cards, wherein said software further configured to collect and store information from each of said card providers regarding their currently offered, temporarily varying, specific deals and incentives that are associated with each of said credit cards, wherein said software further configured to register a portfolio credit card holder to be a user of said service, including collecting and storing information that uniquely identifies said user and each of the various credit cards in the portfolio of said user, wherein said software further configured to collect and store information from said user pertaining to said proposed purchase for which said service advice is desired, wherein said software further configured to analyze, using information on: (a) said proposed purchase of said user, (b) said identifying information on each of the various credit cards in the portfolio of said user, and (c) the temporarily varying deals and incentives applicable to each of the various credit cards in the portfolio of said user, to determine the currently available, comparative financial benefits that would accrue to said user from at this time making said proposed purchase with each of said credit cards in said portfolio of said user, and wherein said software further configured to communicate said comparative-financial-benefits analysis results pertaining to said proposed purchase to said user.

12. The apparatus as recited in claim 11, wherein said software further configured to:

extend said analysis to determine the comparative financial benefits that would accrue to said user from making said proposed purchase with each of said credit cards in the marketplace that are not currently in said portfolio of said user and for which said user meets the qualifications guidelines of each of said credit cards, and communicate the results of said comparative-financial-benefits extended analysis to said user said user.

13. The apparatus as recited in claim 11, wherein said software further configured to:

collect and store information on each of the purchases made by said user with a credit card, analyze said purchase information so as to determine the current status of the total amounts of the purchases on each of said credit cards for specific periods of time, and utilize, for each of said credit cards, the current status of the total-purchase-amounts-per-period determinations in determining the benefits that would accrue to said user for each of said next proposed purchases.

14. The apparatus as recited in claim 12, wherein said software further configured to:

collect and store information on each of the purchases made by said user with a credit card, analyze said purchase information so as to determine the current status of the total amounts of the purchases on each of said credit cards for specific periods of time, and utilize, for each of said credit cards, the current status of the total-purchase-amounts-per-period determinations in determining the benefits that would accrue to said user for each of said next proposed purchases.

15. The apparatus as recited in claim 11, wherein said software further configured to:

alert a service user regarding changes in said deals and incentives being offered for the use of specific credit cards which said user could use for upcoming purchases.

16. The apparatus as recited in claim 14, wherein said software further configured to:

alert a service user regarding changes in said deals and incentives being offered for the use of specific credit cards which said user could use for upcoming purchases.

17. The apparatus as recited in claim 11, wherein said software further configured to:

alert said service user regarding a timely card portfolio management matter that said user is advised to consider.

18. The apparatus as recited in claim 16, wherein said software further configured to:

alert said service user regarding a timely card portfolio management matter that said user is advised to consider.

19. The apparatus as recited in claim 11, wherein said software further configured to:

alert said service user regarding potential adverse effects on the credit rating of said service user of applying for a new credit card.

20. A non-transitory computer-readable medium storing instructions that, when executed, cause a networked server to provide a credit card service that includes maximizing the financial benefits that accrue, to a service user on said network, on the next credit card purchase of said service user from optimally taking advantage of the temporarily varying deals and incentives offered by the various credit card providers, said instructions on said medium comprising the steps of enabling said server to:

collect and store information from each of said card providers regarding each of the credit cards which each of said card providers is currently making available in the marketplace and the general user qualifications guidelines for each of said credit cards, collect and store information from each of said card providers regarding their currently offered, temporarily varying, specific deals and incentives that are associated with each of said credit cards, register a portfolio credit card holder to be a user of said service, including collecting and storing information that uniquely identifies said user and each of the various credit cards in the portfolio of said user, collect and store information from said user pertaining to said proposed purchase for which said service advice is desired, analyze, using information on: (a) said proposed purchase of said user, (b) said identifying information on each of the various credit cards in the portfolio of said user, and (c) the temporarily varying deals and incentives applicable to each of the various credit cards in the portfolio of said user, to determine the currently available, comparative financial benefits that would accrue to said user from at this time making said proposed purchase with each of said credit cards in said portfolio of said user, and communicate said comparative-financial-benefits analysis results pertaining to said proposed purchase to said user.

* * * * *